(12) United States Patent (10) Patent No.: US 9,934,519 B2
Alexander et al. (45) Date of Patent: Apr. 3, 2018

(54) DYNAMIC, SUBSCRIBER DRIVEN CHARGING MODELS FOR MEDIA DISTRIBUTION

(75) Inventors: Michael E. Alexander, Great Falls, VA (US); Sri Ramanathan, Lutz, FL (US); Frank A. Schaffa, Hartsdale, NY (US); Matthew B. Trevathan, Kennesaw, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 947 days.

(21) Appl. No.: 11/969,536

(22) Filed: Jan. 4, 2008

(65) Prior Publication Data

US 2009/0177536 A1 Jul. 9, 2009

(51) Int. Cl.
*G06Q 30/04* (2012.01)
*G06Q 30/02* (2012.01)
*G06Q 40/00* (2012.01)

(52) U.S. Cl.
CPC .............. *G06Q 30/04* (2013.01); *G06Q 30/02* (2013.01); *G06Q 30/0273* (2013.01); *G06Q 30/0283* (2013.01); *G06Q 40/12* (2013.12)

(58) Field of Classification Search
CPC ...... G06Q 30/04; G06Q 20/102; G06Q 20/04; G06Q 20/32; G06Q 20/00; G06Q 20/145; G06Q 30/0613; G06Q 20/1235; G06Q 30/0269; G06Q 20/123; G06Q 20/22; G06Q 20/08; G06Q 20/16; G06Q 30/0257; G06Q 30/0261; G06Q 20/14; G06Q 30/02; G06Q 30/0273; G06Q 30/0283; G06Q 40/02; H04L 12/14; H04L 67/306; H04L 12/1407; H04L 12/1435; H04L 12/18; H04L 65/4076; H04L 65/4084; H04L 29/06027;
(Continued)

(56) References Cited

U.S. PATENT DOCUMENTS 5,621,727 A * 4/1997 Vaudreuil ............. H04L 51/063
370/401
6,157,945 A 12/2000 Balma et al.
(Continued)

OTHER PUBLICATIONS

Lemlouma, Tayeb et al. "Adapted Content Delivery for Different Contexts", IEEE Computer Society, Proceedings of the 2003 Symposium on Applications and the Internet.
(Continued)

*Primary Examiner* — Rajesh Khattar
*Assistant Examiner* — Carol See
(74) *Attorney, Agent, or Firm* — Christopher McLane; Andrew M. Calderon; Roberts Mlotkowski Safran Cole & Calderon, P.C.

(57) ABSTRACT

A system and method is provided to implement charging models for subscriber driven media agnostic content delivery across same or different networks. The method includes receiving content of a first media type over a network from a sending client. The method further includes sending the content or a reference to the content to a receiving client in a preferred media type and to a preferred device in accordance with at least one preference of the receiving client. The method also includes generating a billing record based on the content and user preferences of a sending client and/or a receiving client.

22 Claims, 5 Drawing Sheets

(58) Field of Classification Search
CPC ....... H04L 65/80; H04L 51/066; H04L 29/06;
H04L 65/1059; H04L 12/1485; H04L
12/5835; H04L 12/66; H04L 45/308;
H04L 67/30; H04L 45/306; H04L 65/104;
H04L 67/104; H04L 67/20; H04L
12/5692; H04L 2209/60; H04L 41/509;
H04L 65/60; H04L 12/56; H04L 12/5835;
H04L 67/1014; H04L 67/2823; H04L
12/1403; H04L 51/24; H04M 15/57;
H04M 2201/60; H04M 7/12; H04M
15/00; H04M 2215/0152; H04M
2215/0176; H04M 2215/7435; H04M
15/48; H04M 15/68; H04M 15/07; H04M
15/41; H04M 2215/0196; H04M
2215/2026; H04M 2215/32; H04M
2215/0164; H04M 2215/208; H04M
2215/725; H04M 2215/96; H04W 4/18;
H04W 8/18; H04W 88/16; H04W 40/00;
H04W 4/025; H04N 21/25891; H04N
21/2343; H04N 21/2543; H04N 21/4532;
H04N 21/234309; H04N 21/632; H04N
21/234; H04N 21/309; H04N 21/6547
USPC .......................................................... 705/14
See application file for complete search history.

(56) References Cited

U.S. PATENT DOCUMENTS

| | | | |
|---|---|---|---|
| 6,725,303 B1 | 4/2004 | Hoguta et al. | |
| 6,751,673 B2 | 6/2004 | Shaw | |
| 6,854,007 B1 | 2/2005 | Hammond | |
| 6,965,917 B1 | 11/2005 | Aloni et al. | |
| 6,996,393 B2 | 2/2006 | Pyhälammi et al. | |
| 6,999,566 B1 | 2/2006 | Eason et al. | |
| 7,030,730 B1 | 4/2006 | Zondervan | |
| 7,035,653 B2 | 4/2006 | Simon et al. | |
| 7,653,001 B2* | 1/2010 | Agrawal et al. | 370/252 |
| 7,668,765 B2* | 2/2010 | Tanaka | G06Q 20/201 455/406 |
| 2002/0123934 A1 | 9/2002 | Tanaka et al. | |
| 2002/0129371 A1* | 9/2002 | Emura et al. | 725/61 |
| 2002/0143972 A1 | 10/2002 | Christopoulos et al. | |
| 2002/0147778 A1 | 10/2002 | Dutta | |
| 2003/0037110 A1 | 2/2003 | Yamamoto | |
| 2004/0193648 A1 | 9/2004 | Lai et al. | |
| 2005/0009541 A1* | 1/2005 | Ye | G06Q 10/107 455/466 |
| 2005/0114784 A1 | 5/2005 | Spring et al. | |
| 2005/0136895 A1 | 6/2005 | Thenthiruperai et al. | |
| 2005/0210498 A1* | 9/2005 | Scott, III | G06Q 30/02 725/8 |
| 2005/0283533 A1* | 12/2005 | Schluter | H04L 29/06 709/228 |
| 2006/0015649 A1 | 1/2006 | Zutaut et al. | |
| 2006/0031369 A1* | 2/2006 | Caron | H04L 51/14 709/207 |
| 2006/0184431 A1* | 8/2006 | Rosenberg | G06Q 30/06 705/26.8 |
| 2006/0272028 A1* | 11/2006 | Maes | G06F 17/30873 726/27 |
| 2007/0055783 A1 | 3/2007 | Gourraud | |
| 2007/0067424 A1* | 3/2007 | Raciborski et al. | 709/223 |
| 2007/0143775 A1* | 6/2007 | Savoor et al. | 725/1 |
| 2007/0162228 A1 | 7/2007 | Mitchell | |
| 2008/0082649 A1 | 4/2008 | Gazier et al. | |
| 2008/0101455 A1 | 5/2008 | Scheelke | |
| 2008/0207182 A1* | 8/2008 | Maharajh | G06F 17/30035 455/414.1 |
| 2008/0292074 A1 | 11/2008 | Boni et al. | |

OTHER PUBLICATIONS

Wan, Andrew et al., "Profile Based Routing and Billing Multimedia Content Delivery Network", IEEE Computer Society, Proceedings of the International Conference on Networking, International Conference on Systems and International Conference on Mobile Communications and Learning Technologies, 2006.

"MMS MM1 Stage 3, Using SIP", 3$^{rd}$ Generation Partnership Project 2 "3GPP2".

Pospischil, Günther et al., "A Location-based Push Architecture using SIP".

Camarillo, C. et al, "RFC 4117—Transcoding Services Invocation in the Session Initiation Protocol (SIP) Using Third Party Call Control (3pcc)", URL: http://www.packetizer.com/rfc/rfc4117, Jun. 2005.

Non-Final Office Action dated Jun. 15, 2010, for related U.S. Appl. No. 11/969,550.

Badii, et al., "Profiling Management . . . ", Proceedings of the Second International Conference on Automated Production of Cross Media Conent . . . , 2006, 8 pages.

Notice of Allowance dated Mar. 26, 2012 in U.S. Appl. No. 11/969,550.

Office Action dated Oct. 6, 2011 in U.S. Appl. No. 11/969,550.

Office Action dated Nov. 17, 2015, in related U.S. Appl. No. 13/480,686, 20 pp.

Notice of Allowance in related U.S. Appl. No. 13/480,686 dated Apr. 12, 2017, 18 pages.

Final Office Action in related U.S. Appl. No. 13/480,686 dated Apr. 28, 2016, 25 pages.

Office Action in related U.S. Appl. No. 13/480,686 dated Dec. 27, 2016, 20 pages.

Final Office Action dated Nov. 29, 2010 for related U.S. Appl. No. 11/969,550.

3rd Generation Partnership Project 2 "3GPP2", "MMS MM1 Stage 3, Using SIP", Jun. 2004, 42 pages.

Pospischil, Gunther et al., "A Location-based Push Architecture using SIP", 2001, 7 pages.

* cited by examiner

DYNAMIC, SUBSCRIBER DRIVEN CHARGING MODELS FOR MEDIA DISTRIBUTION

FIELD OF THE INVENTION

The invention generally relates to a system and method for computer systems and, more particularly, the invention relates to a system and method of implementing charging models for subscriber driven media agnostic content delivery across same or different networks.

BACKGROUND OF THE INVENTION

In recent years, the digital media marketplace has been ever expanding. For example, more and more content is migrating from traditional mechanisms to be digitally generated, electronically distributed and rendered in a variety of mechanisms. With this known, there are many trends in the market place today.

For example, while most Tier 1 content is generated by content creators such as movie studios and record labels, more and more content is generated by individuals. For this reason, better tooling and content creation environments are increasingly becoming commoditized, putting these creation capabilities in the hands of individuals. But, while Tier 1 content creators have worked hard to spend significant money on infrastructure to traditionally and digitally distribute the content, the Internet is, itself, now permitting individuals to play a more significant role in the distribution of content. In fact, peer to peer content sharing mechanisms have become commonplace, becoming the single biggest consumer of Internet bandwidth globally.

While the Tier 1 content creators, aggregators, and distributors and device manufacturers all want to restrict where and how the content is rendered (so that they can then work towards maximizing their portion of the revenue), individuals want control over where and how they view the content of their choice. For this reason, individuals are creating their own content and using peer to peer content sharing mechanisms to distribute such content. However, the sharing of content becomes very difficult, if not impossible, with competing and incompatible communication protocols, media formats, different standards for media conversion and content delivery mechanisms.

Accordingly, there exists a need in the art to overcome the deficiencies and limitations described hereinabove.

SUMMARY OF THE INVENTION

In a first aspect of the invention, a method comprises receiving content of a first media type over a network from a sending client. The method further includes sending the content or a reference to the content to a receiving client in a preferred media type and to a preferred device in accordance with at least one preference of the receiving client. The method further includes generating a billing record based on the content and user preferences of a sending client and/or a receiving client.

In another aspect of the invention, a method is provided for charging a subscriber for sending subscriber driven media agnostic content delivery across different networks. The method comprises providing a computer infrastructure operable to generate a billing report based on at least one of a type of content to be delivered and one or more charging preferences of a sending client and/or receiving client.

In yet another aspect of the invention, a computer program product is provided for charging subscriber driven media agnostic content delivery across networks. The computer program product comprises: a computer readable media; first program instructions to send the content or a reference to the content to a receiving client in a preferred media type and to a preferred device in accordance with at least one preference of the receiving client; and second program instructions to generate a billing report based on at least one of a type of content to be delivered to the receiving client and one or more charging preferences of a sending client and/or the receiving client. The first and second program instructions are stored on the computer readable media.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF EMBODIMENTS OF THE INVENTION

The invention generally relates to a system and method for computer systems and, more particularly, the invention relates to a system and method of implementing charging models for subscriber driven media agnostic content delivery across same or different networks. The system and method of the invention provide a unique mechanism and infrastructure focused on peer to peer distribution and delivery of content. For example, the system and method of the present invention are structured and configured to use existing telecommunications networks, i.e., primarily non-IMS (IP Multimedia Subsystem) based networks, as well as IMS based core networks, to deliver content of different types to different compatible and incompatible devices, and to provide charging models for such services. As should be known to those of skill in the art, IMS is an architectural framework for delivering internet protocol (IP) multimedia to mobile users.) As such, the system and method of the present invention can be supported on a completely wireless broadband based architecture where the focus has shifted from an access based provider to one that is primarily content driven over "fat pipes."

Accordingly, in implementation, service providers can support end to end points implementing the system and method of the present invention, even through an extended migratory period from non-IMS enabled networks to IBM enabled networks. The service providers can also support end to end points, regardless of the devices and media type. Also, the system and method of the invention provides a flexible means of media management, while also providing different charging schemes for the services rendered in accordance with the invention.

System Environment

Figure 1:
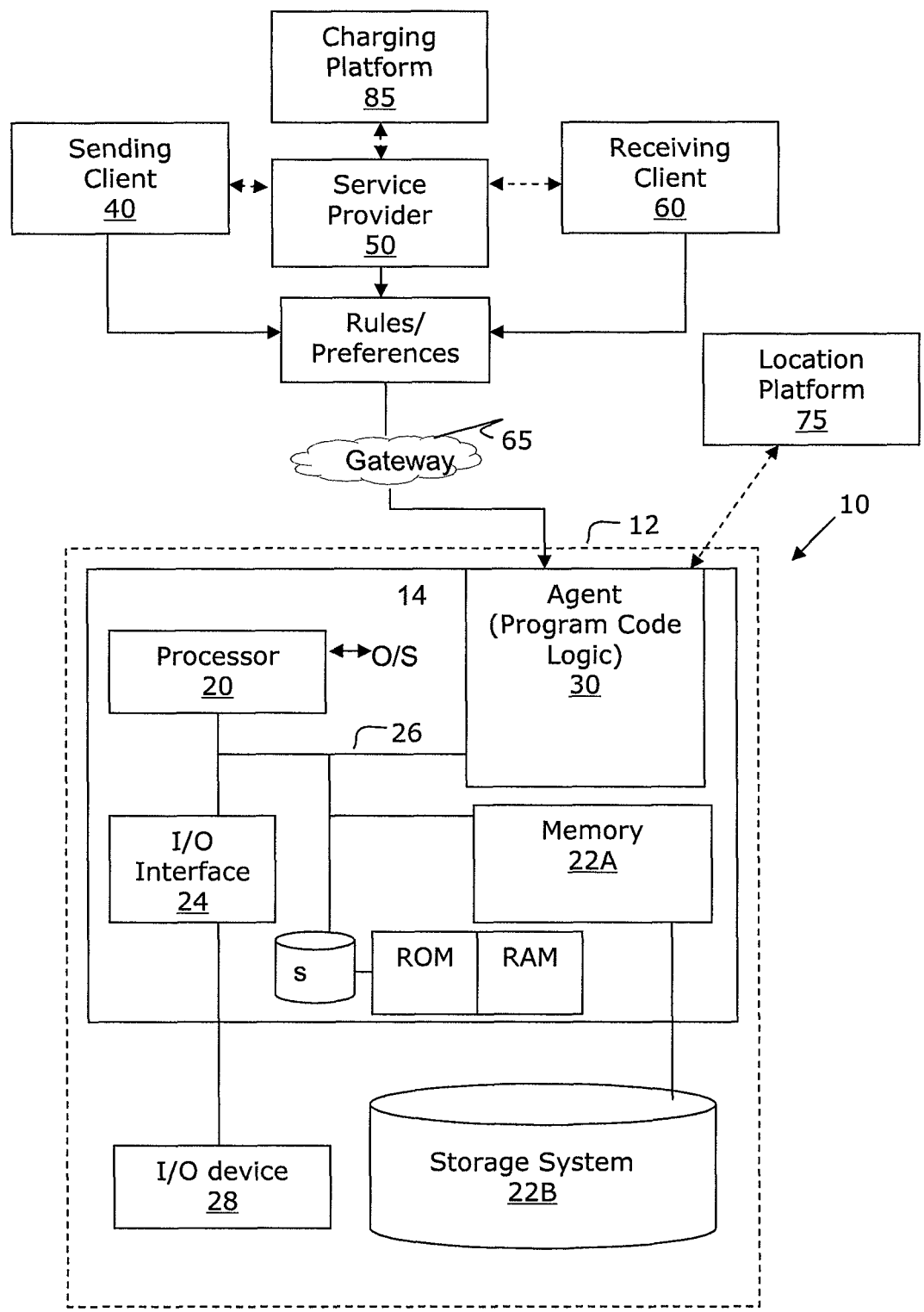
FIG. 1 shows an illustrative environment for implementing aspects of the present invention.

FIG. 1 shows an illustrative environment 10 for managing the processes in accordance with the invention. The environment 10 includes a computer infrastructure 12 that includes a computing device 14. The computing device 14 comprises an Agent 30 (also referred to as a Media Processing and Distribution Agent), which makes the computing device 14 operable to route content (e.g., multimedia content) of different types over different types of networks and/or protocols and/or to disparate devices based on rules (also referred generally as preferences and/or profiles) provided by, for example, a sending client 40, a service provider 50 and/or a receiving client 60, via a gateway 65. (See also discussion of FIG. 5.)

In embodiments, the service provider can be a Solution Integrator, content provider, telecommunications company, or other third party offering to perform the processes described herein. In this case, the service provider can create, maintain, deploy, support, etc., the computer infrastructure 12 that performs the process steps of the invention for one or more customers, e.g., a sending client 40 and/or a receiving client 60. In return, the service provider can receive payment from the customer(s) under a subscription and/or fee agreement.

The sending client 40, service provider 50 and/or receiving client 60 can provide preferences to the Agent 30, via a Messaging Gateway Framework 65. The Messaging Gateway Framework 65 may also be provided to send notifications and messages (including content of different types using different protocols) to the sending client 40 and the receiving client 60, using a host of protocols (as discussed herein) and regardless of the device of the sending or receiving client. The preferences can be stored in a storage system (e.g., highly scalable database) 22B. The storage system can be, for example, a Home Subscriber Service (HSS) Profile Manager, in the case of IMS content.

By defining the preferences, the present invention provides a flexible means of media management, which media can be manipulated. That is, by defining the preferences the Agent 30 can efficiently enable the distribution of content, from a subscriber to another subscriber or set of subscribers, using a set of subscriber defined preferences, for both IMS and non IMS domains. The subscribers can be, for example, the sending client 40, service provider 50 and/or receiving client 60. The preferences can include, for example:

A list of preferred devices to receive content (e.g., IMS or non-IMS enabled devices such as, for example, cellular telephone or set-top box (STB), to name a few;

A location preference of the receiving client 60 (e.g., a location to receive content);

A list of desired notification types to inform the sending client 40 and/or the receiving client 60 of content;

A desired media format (media type) (in this way, the receiving client 60 no longer has to worry about media type, given the proliferation of media types and the fact that there are different standards for media conversion, which are constantly being changed by standards bodies);

A list of "best times" to send and/or receive content and a size limit of content that will be accepted, for example;

A request by the receiving client 60 to view the same content on multiple devices; and/or Other Quality of Service Attributes (QSA) associated with the delivery of content.

As one preference is a desired media type, the present invention contemplates whether transcoding of the content is necessary in order for the receiving client 60 to view the content, amongst other features. In the case of transcoding, the Agent 30 can allow content and metadata transformation as part of the workflow processing to satisfy all requests. A determination as to the type of content and whether the content needs to be transformed can be made by the Agent 30, for example, by parsing header information of the content. Also, in implementation, the present invention factors in location based delivery via integration to a network housed location platform 75, using protocols such as Open LS or Parlay X.

In further implementations, the Agent 30 supports a variety of notification and delivery channels. For example, it is contemplated that the Agent 30 can support XMPP (Extensible Messaging and Presence Protocol), MMSC (Multimedia Messaging Switching Center), WAP (Wireless Application Protocol), SMS (Short Message Service) and SMTP (Simple Mail Transfer Protocol) (including out of band notifications), IMS Handsets via a SIP (Session Initiation Protocol) client, Web Services (SOAP and REST) and STB. The Web Services allow application and automated process integration where required. In the case of an IMS network, the Agent 30 can incorporate SIP based session control (or provide instructions for such session control) while ensuring that the actual digital media is referenced as an external object that can then be referenced in the media stream via a media server. In this way, the system can support a plethora of handsets (e.g., 2G, 3G and possibly 4G handsets), each of which have different rendering capabilities, browser based applications, portable media players, gaming consoles, non standard devices such as Set Top Boxes and applications which are endpoints by means of using REST or SOAP style invocations and providing end point implementations. The Agent 30 can also provide for or set-up necessary edge based caching so as to optimize delivery of the content, and provide for integration into both an IMS and non-IMS accounting and charging platforms.

In addition, a charging platform 85 is provided in order to provide charging models to charge for services rendered. The charging platform 85 may be maintained, deployed, created and/or serviced by the service provider 50. The charging platform 85 is designed to generate a charging record for services rendered to a subscriber, e.g., the receiving client and/or the sending client (originator) will be charged for the services rendered (sending or receiving of content) based on the charging model implemented by the system and method of the invention. In embodiments, the service provider 50 and/or Agent 30 can calculate an amount to be charged, based on many different considerations and generate the charging record to be sent to the charging platform 85. In turn, the charging platform can generate an invoice and/or deduct a usage charge from an account of the subscriber.

The charging model(s) may be applicable to either or both of the sending client 40 and the receiving client 60. Also, as discussed in more detail herein, the sending client 40 and/or the receiving client 60 may select one or more of the charging models during set-up (see, FIG. 2) from a set-up window via scrolling or other known mechanism based on the charging models discussed herein. The charging model can be implemented as a charging preference set-up prior to using the media distribution services of the present invention; although the preferences can be altered during actual service invocation.

The charging model will be used by the Agent 30 and/or service provider 50 to create and maintain a charging record of the services provided in accordance with the invention. More specifically, in embodiments, the system and method of the invention will use the charging preferences in order to validate the charging methodology. Any created charging record can then be provided to the sending client 40 and/or receiving client 60, for submission of payment.

Many different considerations may be taken into account to determine how much is charged for the services rendered in accordance with the present invention. In one example, a different charging model may be devised for different scenarios in a peer to peer media distribution system in accordance with the invention. By way of illustration, a different charging model may be used to support multiple subscriber endpoints such as, for example, a plethora of Handsets each of which have different rendering capabilities (e.g., 2G, 3G and possibly 4G handsets), browser based applications, portable media players, gaming consoles, non-standard devices such as Set Top Boxes and applications which are endpoints by means of using REST or SOAP style invocations and providing end point implementations. Also, a premium charge may be applied based on a particular subscriber endpoint. So, for example, a premium charge may be provided for a non-compatible device with the network, e.g., a non-IMS compatible device.

Additionally, a charging model may be based on different complexities required during the transcoding and delivery of media. For example, a MPEG2 to MPEG4 conversion may require a different amount of processing cycles than a HD-DVD to MPEG2 conversion and, as such, may be billed at a higher rate (premium rate). Also, time sensitivity could make content more valuable depending on when it is shared and used (viewed) temporally. So, for example, a piece of content (e.g., a boxing match) may have greater value if immediately shared, and less when it is shared a day after the event, less a week later and so on. Accordingly, more time sensitive content may be billed at a higher rate (premium rate) than less time sensitive content which is not immediately sent to the receiving client (even though it is time sensitive material).

Charging models may be based on a number of other variables, including, for example, the number of times a shared piece of content is viewed. In this example, the charging model may be based on each time content is viewed or sent to different recipients.

Other variables that can affect the charging model include, for example, a specific window of time within which a piece of content may be used, the location that the content is sent from or to, the number of destination devices (for example, it is possible to send the same piece of content to multiple destinations for the same time from two perspectives), the number of subscribers with a single device or a single subscriber with multiple devices and any combination of the above. In these examples, the charging model may include an increase in cost (premium charge) for sending content to multiple destinations (multiple receiving clients or multiple devices from a single receiving client or a combination thereof) or receiving content at multiple destinations or a certain location.

It is further contemplated that other considerations may be taken into account for charging of the services rendered in accordance with the invention. For example, the subscriber may be a prepaid consumer (in which case the service provider (or charging platform) can deduct a charge from a balance in order to support media distribution transactions which the subscriber has initiated). As a prepaid consumer, the consumer may be provided with a discount for services rendered. A premium charge may be applied to subscribers that are post paid customers (billed after the transaction) or subscribers that are ad hoc customers (pay as they go).

It is also contemplated by the present invention that charges may not apply to subscribers that do not view the content. So, for example, there would be no charge for content sent to Subscriber "A", which is not viewed (because subscriber "A" deleted the content, was not available to receive the content, etc.).

It is further contemplated by the present invention that content can be provided on a "no charge" or reduced fee basis if the recipient is willing to view an advertisement prior to the content. In embodiments, it is contemplated that the recipient will receive a reduced fee or no charge once the recipient has actually viewed the advertisement, which can before or after viewing the content. In this scenario, the Agent 30 can monitor whether the recipient has viewed the advertisement by the use of known monitoring technologies (e.g., an agent residing on the device of the receiving client) in order to provide the discount.

In one implementation, at any time, any of the subscribers can opt out of such premium (or other) based services. For example, by opting out, the receiving client would not receive any content that would be charged at a premium rate.

In any of the above charging models, for example, the service provider 50 and/or Agent 30 can provide notification to the subscriber that a charge (including a premium charge) may be applied for certain types of services. For example, the service provider 50 and/or Agent 30 would provide notification to the subscriber that a premium charge may be applied for time sensitive material or extensive use of processing cycles (computer resources), a route that the content must take in order to be viewed by the receiving client, an amount of data (e.g., content) that is either sent by the sending client or viewed by the receiving client, etc.

The computing device 14 includes a processor 20, a memory 22A, an input/output (I/O) interface 24, and a bus 26. The memory 22A can include local memory employed during actual execution of program code, bulk storage, and cache memories which provide temporary storage of at least some program code in order to reduce the number of times code must be retrieved from bulk storage during execution. Further, the computing device 14 is in communication with an external I/O device/resource 28 and the storage system 22B. As should be understood, in certain implementation such as non-IMS enabled networks, the storage system 22B may be internal to the Agent 30.

The I/O device 28 can comprise any device that enables an individual to interact with the computing device 14 or any device that enables the computing device 14 to communicate with one or more other computing devices using any type of communications link. For example, the external I/O device/resource 28 may be keyboards, displays, pointing devices, etc.

In general, the processor 20 executes the program code, which is stored in memory 22A and/or the storage system 22B and/or the Agent 30. While executing the program code, the processor 20 can read and/or write data to/from the memory 22A, storage system 22B, I/O interface 24, and/or Agent 30. The bus 26 provides a communications link between each of the components in the computing device 14.

The computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the process described herein. Further, while performing the processes described herein, one or more computing devices in the computer infrastructure 12 can communicate with one or more other computing devices external to the computer infrastructure 12 using any type of communications link (e.g., location platform, gateway, etc.). The communications link can comprise any combination of wired and/or wireless links; any combination of one or more types of networks (e.g., the Internet, a wide area network, a local area network, a virtual private network, etc.); and/or utilize any combination of transmission techniques and protocols.

Exemplary Processes in Accordance with the Invention

Figure 2:
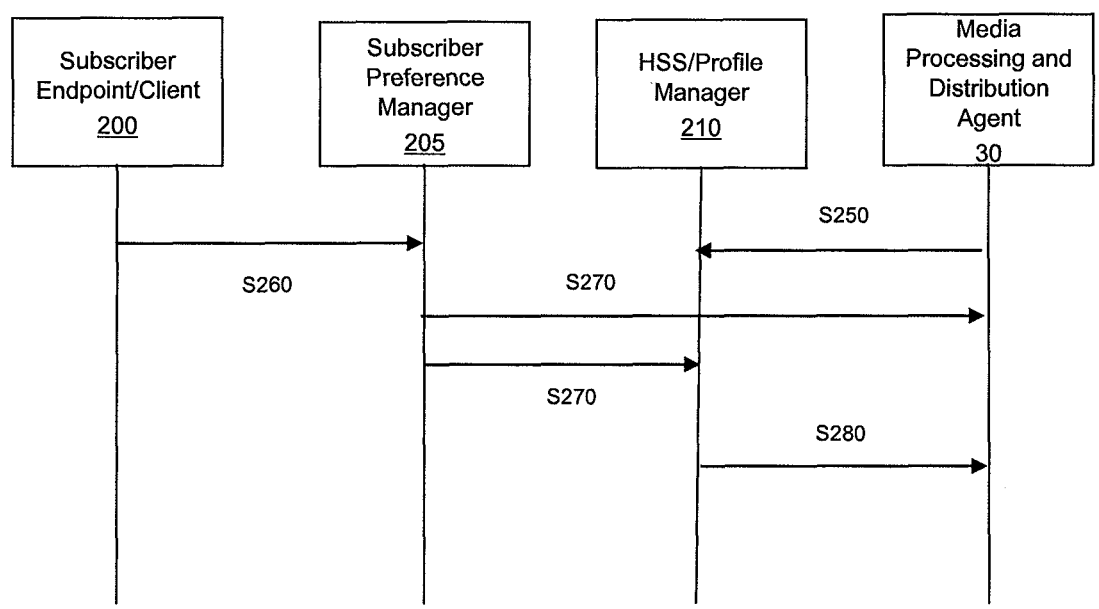
FIG. 2 shows a set-up implementation in accordance with the present invention.
Figure 3:
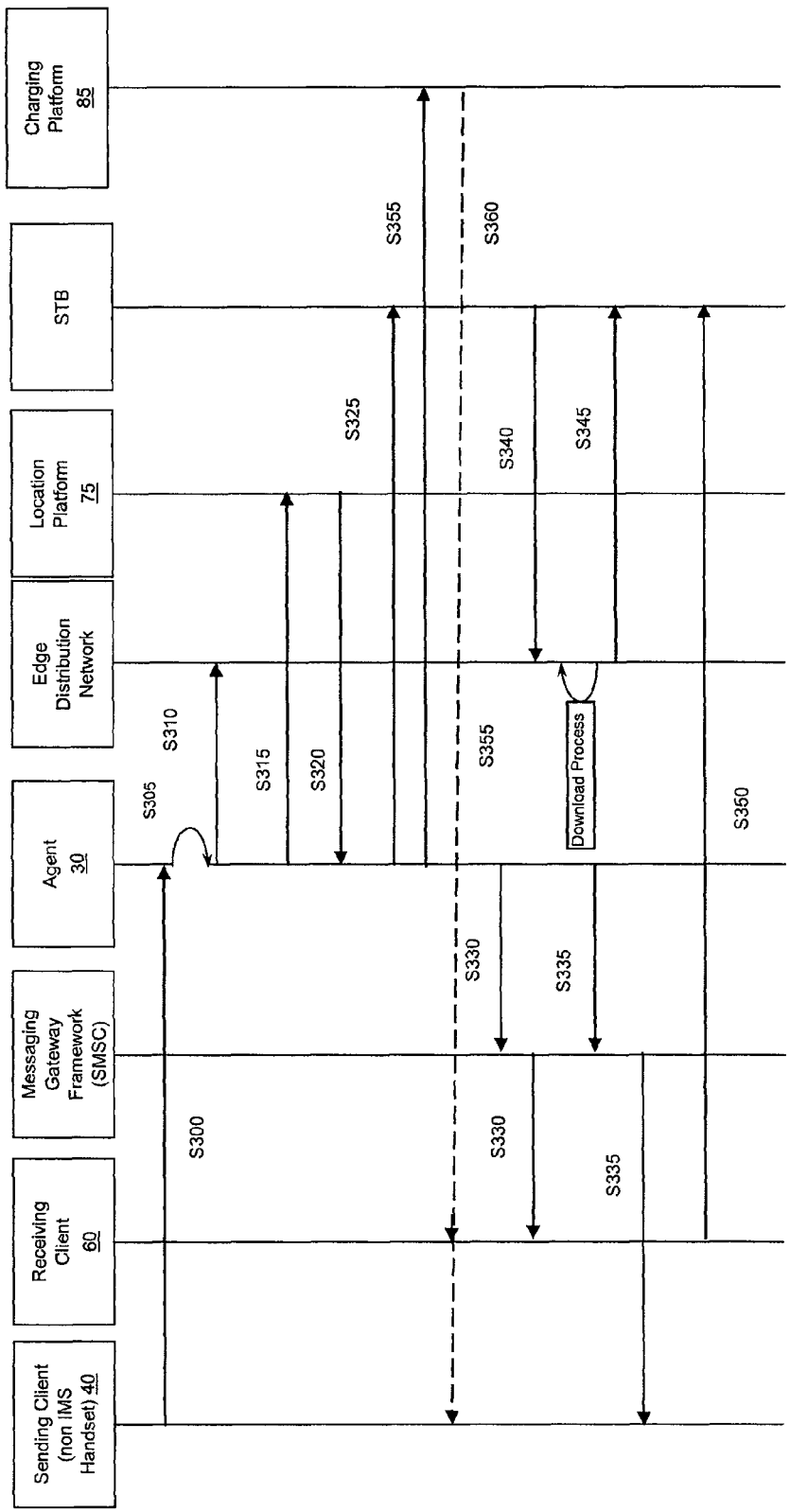
FIG. 3 shows a process flow for content distribution in accordance with the present invention.
Figure 4:
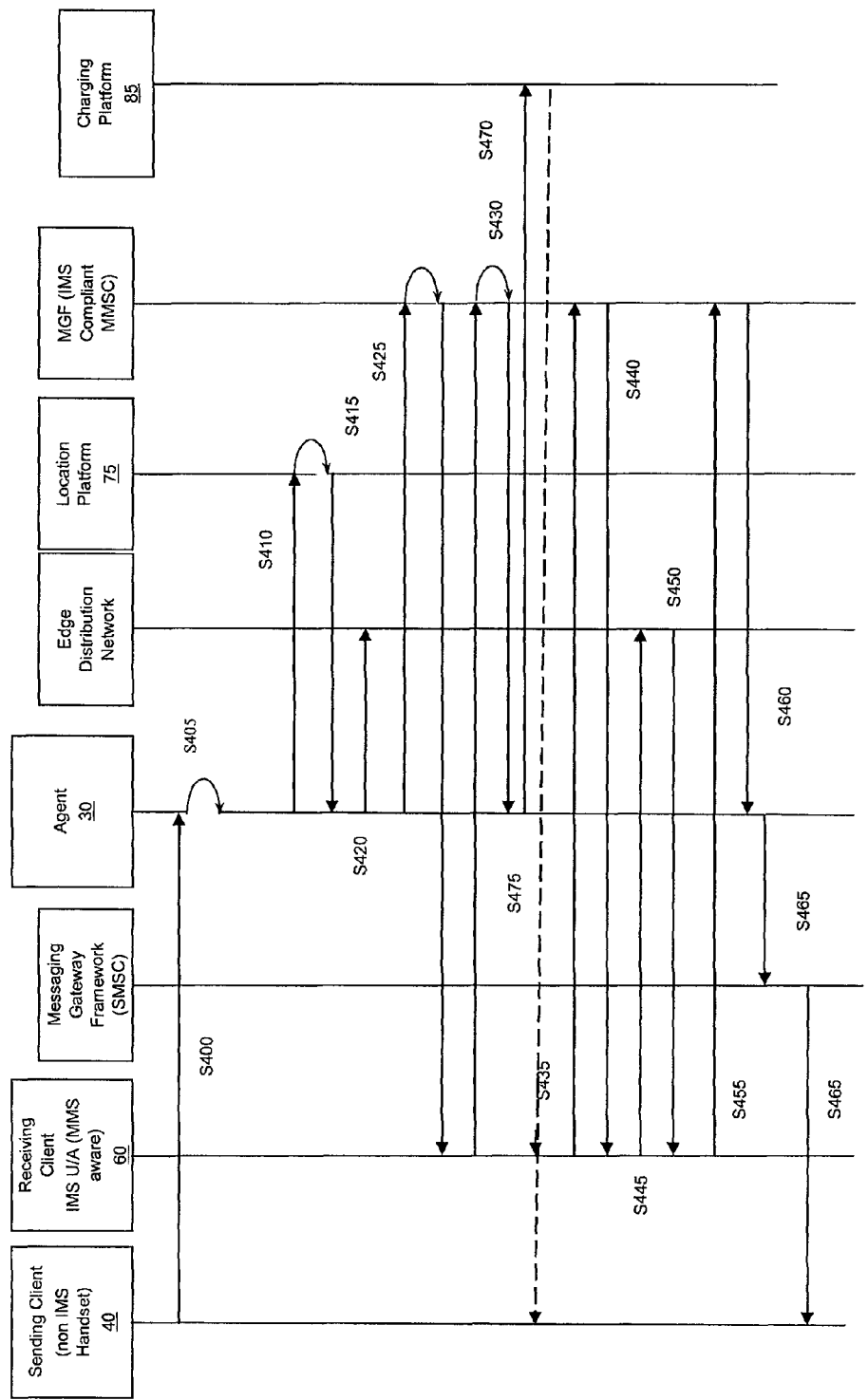
FIG. 4 shows a specific example of a process flow for content distribution in accordance with the present invention.

Generally, the invention includes a set-up flow and a content distribution processing flow. By way of example, FIG. 2 shows a set-up implementation in accordance with the invention; whereas, FIG. 3 shows a process flow for content distribution in accordance with the invention. FIG. 4 shows a specific example of a process flow for content distribution in accordance with the invention.

Although FIGS. 2-4 are shown as swim lane diagrams, it should be understood by those of skill in the art that the swim lane diagrams can equally represent flow diagrams or high-level block diagrams of components of the invention implementing the steps thereof. The processes of FIGS. 2-4 may be implemented on computer program code (via the Agent 30) in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation over the Internet or some other type of network.

The invention can take the form of an entirely hardware embodiment or an embodiment containing both hardware and software elements (any of which is referred generally as "file management program"). The hardware and software elements include a computer infrastructure configured to implement the functionality of the present invention, as shown in FIG. 1. The software elements may be firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Referring to FIG. 2, the swim lane diagram shows the following participants: a sending client and receiving client (depicted generally as Subscriber Endpoint Client 200), a Subscriber Preference Manager 205 (also known generally as a web tool), an HSS/Profile Manager 210 and the Agent 30 (also referred to as a Media processing and Distribution Agent). It should be recognized by those of skill in the art that the Subscriber Preference Manager 205, HSS/Profile Manager 210 and Agent 30 may be supported, maintained, deployed, serviced and configured by the service provider, in any combination, as well as being implemented in the computing infrastructure of FIG. 1. The receiving client can represent a plethora of handsets (e.g., 2G, 3G and possibly 4G handsets), each of which have different rendering capabilities, browser based applications, portable media players, gaming consoles, non standard devices such as Set Top Boxes and applications which are endpoints by means of using REST or SOAP style invocations and providing end point implementations.

In the implementation of FIG. 2, at step S250, if necessary, the Agent registers with the HSS/Profile Manager. In one implementation, the HSS/Profile Manager is based on a Diameter infrastructure (e.g., in the case of IMS networks) in which case the HSS/Profile Manager will receive notifications from the Agent via a Diameter protocol when changes to subscriber profiles (preferences) are made by the Subscriber Endpoint Client.

At step S260, the Subscriber Endpoint Client logs in and configures delivery and receipt of the preferences via the Subscriber Preference Manager. For example, in step S260, the Subscriber Endpoint Client can provide its preferences to the Subscriber Preference Manager via an HTTP. In embodiments, these preferences can include the preferred charging methodologies (which can later be validated). The Subscriber Preference Manager, in turn, updates the HSS/Profile Manager and, if necessary, the Agent (depending on the network (IMS vs. non-IMS enabled networks), at step S270. At step S280, if necessary, the HSS/Profile Manager sends notifications (via the Diameter protocol) to the Agent, so as to remain synchronized. Although a certain order is shown, the processes of the present invention may be provided in a different order, e.g., step S280 may be performed directly after or at any time after step S250.

It is to be noted that during call flow, HSS lookups do not have to be performed to aid in the overall performance of the system. Also, any information received via the Diameter protocol as part of the provisioning process (e.g., set-up process) can be cached within the Agent platform (e.g., storage system 22B). Moreover, it is contemplated by the present invention that the set-up information can be periodically updated and, as such, provisions are provided to update the database so to add new devices and/or other preferences, when requested by the Subscriber Endpoint Client (sending client or receiving client), to the solution mix.

FIG. 3 shows a representative call flow implementing a runtime operation of the system. In this representative call flow, content is delivered from one subscriber to another subscriber, using SMS and a Set Top Box as the end points in play, in a non IMS context. More specifically, at step S300, the sending client makes a request to the Agent. Upon receipt, the Agent retrieves both the sending client and the receiving client preferences (profile) at step S305. In this way, the Agent can determine the method of content delivery to the receiving client, as well as the type of transcoding operations and other operations (such as the performing of location dips using a location platform) that are required to transmit the content to the receiving client. Also, the sender preferences are used, for example, to determine how delivery reporting, e.g., notifications, can be delivered to the sending client and/or the receiving client.

At step S305, if necessary, the Agent can perform value added processing such as, for example, transcoding, as well as make a determination of the actual delivery channels. It is also contemplated that the transcoding, to save overhead, can be performed by the sending client or other participant, if resources (e.g., hardware and software) are available on the particular devices.

At step S310, the content can be delivered to an edge content location for future retrieval by the preferred device of the receiving client (e.g., STB). The content can be delivered directly from the sending client or, in other embodiments, via the Agent.

At step S315, if necessary, the Agent contacts the location platform to determine the location of the receiving client. (In embodiments, the location platform may be part of the Agent.) This can be done in any conventional manner such as, for example, via a GPS transceiver or other known messaging. At step S320, the location platform determines the location of the receiving client and provides this location information to the Agent. As such, the location, geographic separation and preferences of both the receiver and the sender may be used as factors implementing one or more rules within the system and method of the invention. The communication with the location platform may be performed via an Open LS Request and Response, for example. It should be recognized, though, that other communication protocols are also contemplated by the invention, as discussed herein.

At step S325, the Agent notifies the preferred device of the receiving client that content is ready for delivery. In embodiments, depending on the content and delivery preferences, the notification can be provided to a STB (Set Top Box) or other user-defined device. For example, after determining that the receiving client is at or near his/her residence and based on the preferences of the receiving client, the Agent can send a notification of content to the STB in the receiving client's residence. The notification can be a reference to the content which resides, for example, on the edge network distribution (e.g., a server at the edge of the network, geographically nearer to the target client). The content can be retrieved by the STB or other preferred device, for example, from the server on the network, via the reference.

At step S330, a notification can be provided to the cellular telephone or other device of the receiving client, again depending on the preferences. This notification will notify the receiving client that content is ready to be downloaded on a preferred device. In the case of a cellular telephone, for example, the notification can be sent to the Messaging Gateway Framework (65) via a short message peer-to-peer protocol (SMPP) notification and then to the target client via an SMS notification. Similarly, at step S335, a notification can also be provided to the cellular telephone or other device of the sending client, again depending on the preferences. Again, in the case of a cellular telephone, for example, the notification can be sent to the Messaging Gateway Framework via a SMPP notification and then to the sending client via an SMS notification. This notification can indicate, amongst other notices, that the receiving client has received a notification of the content and/or has downloaded the content.

At step S340, the preferred device of the receiving client (in this example the STB), requests the content from the server. In this example, the STB (or other preferred device) asynchronously requests the content and downloads it locally. At step S345, the content is sent to the preferred device. In embodiments, as discussed above, the Agent can send a notification to the sending client that the content has been delivered to the receiving client. At step S350, the receiving client can view the content on the preferred device.

At step S355, the Agent generates a charging record that is sent to the charging platform. In embodiments, prior to the generation of a charging record, the Agent will make a determination of the charging methodology selected by either or both of the receiving client and/or the sending client. This can be performed by using the preferences selected by the receiving client and/or the sending client. Also, a determination may be made by the Agent to determine the type and amount of content sent from the sending client to the receiving client, in order to generate the billing record. For example, the client may be charged a premium for: (i) the use of a certain handset with certain capabilities, (ii) computer resources (e.g., converting MPEG2 to MPEG4), (iii) the number of times a shared piece of content is viewed, (iv) the time window within which a piece of content needs to be used, (v) the location that the content is sent from or to, (vi) the number of destination devices, (vii) the number of subscribers, with a single device or a single subscriber with multiple devices and any combination of the above, (viii) a route required to send the content to a receiving client, etc. At step S360, the charging record is sent to either or both the sending client and the receiving client, as appropriate. The clients may receive a notification of a billing event prior to the sending of the charging record.

FIG. 4 shows a specific example of a process flow for content distribution implementing a SIP enabled MMS delivery in an IMS compliant environment in accordance with the invention. More specifically, in this example, the process flow shows an MMS (multimedia messaging system) based delivery in an IMS environment using the MMS SIP specification (i.e., 3GPP2 X.S0016-312), as applicable to this environment. In this example, it is assumed that all regular pre-processing of the SIP User Agent (UA) that is Multimedia enabled has occurred, prior to the implementation of the remaining processing. For example, the pre-processing includes:

The SIP UA has already registered with the IMS core (registrar) via S-CSCF (IP Multimedia subsystem) and any IFC (Internet Firewall Connection) via the HSS; and The MMS infrastructure is SIP aware and IMS compliant and is also registered to participate in the interaction.

Also, it should be recognized that to simplify the call flow for illustrative purposes, the interaction from the Agent and the SIP aware MMSC (Multimedia Messaging Switching Center) is not depicted as flowing through an S-CSCF node(s). Also, as discussed above, as the media objects can be large, indirect notification via a reference is assumed, which is a specification supported case. Also, FIG. 4 does not show delivery reporting in detail as the purpose of this swim lane diagram is to focus on a methodology of content distribution in accordance with the invention.

Referring now specifically to FIG. 4, at step S400, the sending client makes a request to the Agent (for delivery of content to a receiving client). In this embodiment, the sending client is on a non IMS handset and, as such, the request is not a SIP U/A. At step S405, the Agent performs the following exemplary types of activities:

determines preferences of all involved participants. For example, the receiving client preferences will inform the Agent how the content is to be delivered and what type of transcoding operations and other operations (such as the performing of location dips using a location platform) are needed to send the content. The sending client preferences are needed to determine how delivery reporting can be delivered; and determines the actual delivery channels to use in both directions.

At step S410, the Agent opens communication with the location platform, if necessary, to determine the location of the receiving client. At step S415, the location platform determines the location of the receiving client and provides this location information to the Agent. As noted above, the location, geographic separation and preferences of both the receiver and the sender may be used as factors implementing one or more rules within the system and method of the invention. The communication with the location platform may be performed via an Open LS Request and Response, for example. It should be recognized, though, that other communication protocols are also contemplated by the invention, as discussed herein.

At step S420, after the Agent determines that there is an SIP end point, the content is transcoded and sent to the edge caching tier for temporary transient storage. At step S425, the Agent sends a SIP message request (notification of content) to the IMS Compliant MMSC, which then contacts and notifies the SIP U/A, on the receiving client, that content is available for viewing. The IMS Compliant MMSC may be a Media Gateway Framework (MGF), which includes the set of delivery channels identified in FIG. 5. The MGF uses the instructions it is provided, based on the preferences, to route notifications and data to both endpoints (sending client and receiving client).

At step S430, the receiving client sends a SIP message response to the IMS compliant MMSC, which makes it back to the Agent (via the MMSC). At step S435, the receiving client (SIP U/A) requests the message contents by sending an indirect message request to the MMSC. At step S440, the MMSC responds with a Message Response SIP message with the indirect reference to the content's logical location in the edge distribution network.

At step S445, the receiving client (SIP U/A) requests the content via an MM1_Retrieve.REQ request. It should be understood by those of skill in the art that the request could have also been sent directly to the MMSC. At step S450, the receiving client receives an MM1_Retrieve.RES in response to the request. At step S455, the SIP U/A generates a delivery acknowledgement via the MM1_Acknowledgement REQ SIP message sent to the MMSC. At step S460, the MMSC notifies the Agent with the same MM1_Acknowledgment REQ message. At step S465, the Agent generates an SMPP message to be delivered to the originating (sending client) handset via the Messaging Gateway Framework, which will generate an OTA SMS message. This SMS message will confirm delivery receipt of the content to the receiving client.

At step S470, the Agent generates a charging record that is sent to the charging platform. In embodiments, prior to the generation of a charging record, the Agent will make a determination of the charging methodology selected by either or both of the receiving client and/or the sending client. This can be performed by using the preferences selected by the receiving client and/or the sending client. Also, a determination may be made by the Agent to determine the type and amount of content sent from the sending client to the receiving client, in order to generate the billing record. For example, the client may be charged a premium for: (i) the use of a certain handset with certain capabilities, (ii) computer resources (e.g., converting MPEG2 to MPEG4), (iii) the number of times a shared piece of content is viewed, (iv) the time window within which a piece of content needs to be used, (v) the location that the content is sent from or to, (vi) the number of destination devices, (vii) the number of subscribers, with a single device or a single subscriber with multiple devices and any combination of the above, (viii) a route required to send the content to a receiving client, etc. At step S475, the charging record is sent to either or both the sending client and the receiving client, as is appropriate. The clients may receive a notification of a billing event prior to the sending of the charging record.

Exemplary Architecture of the System of the Invention

Figure 5:
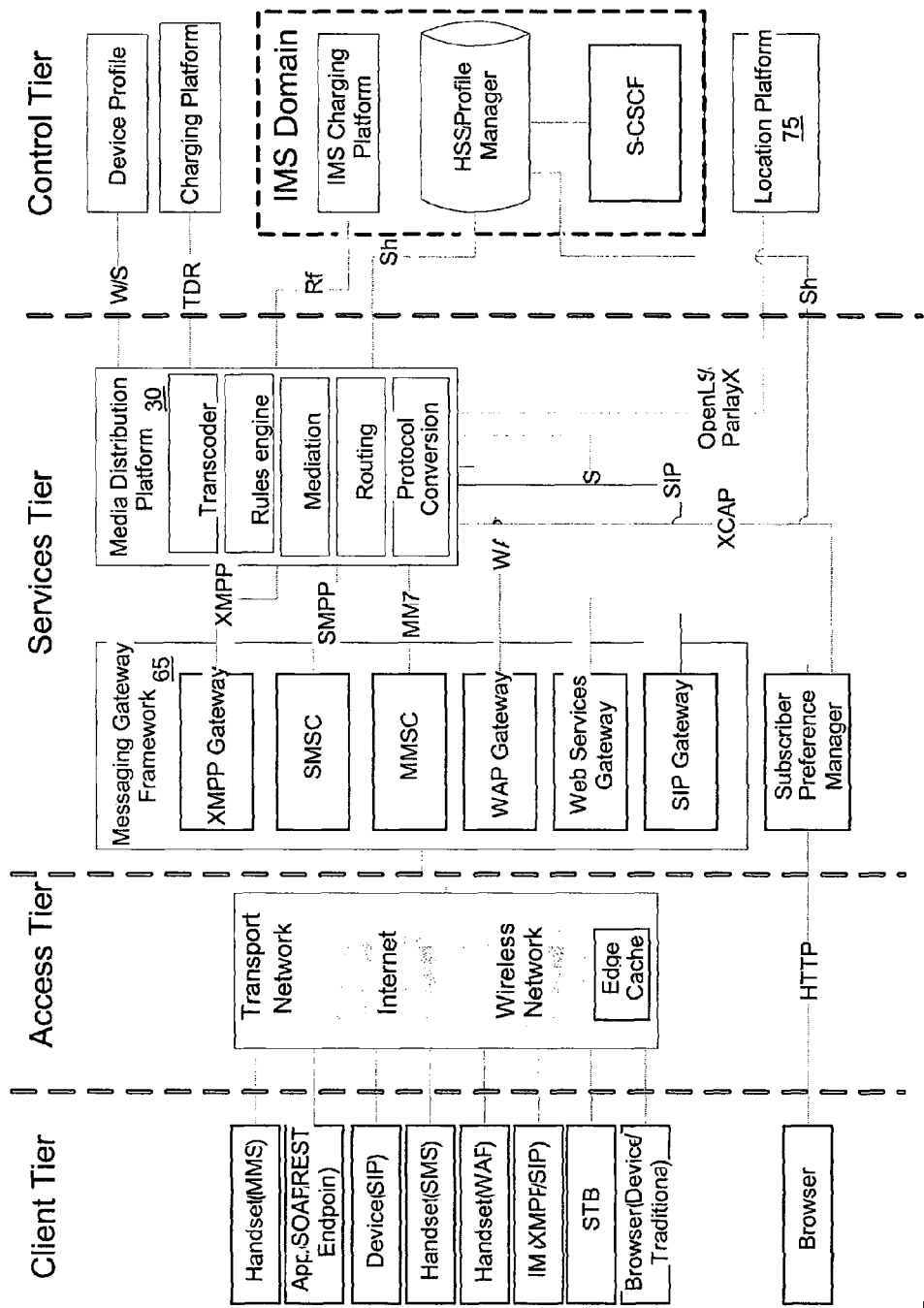
FIG. 5 shows an architect implementing aspects of the present invention.

FIG. 5 shows an exemplary architecture of the system of the invention. In one contemplated embodiment, the architecture includes four tiers: a Client Tier, an Access Tier, a Services Tier and a Control Tier. The Client Tier represents different types of exemplary delivery and user agent endpoints (receiving client and sending clients) that can be supported with the invention. For example, the Client Tier includes MMS, SMS and WAP handsets, as well as STB, traditional browser type devices, SOAP and REST compliant devices, SIP devices and IM (XMPP/SIP) devices. Each of these devices/handsets is compatible with the system such that they can receive notifications and/or content in accordance with the invention. The Client Tier can also include a browser for initial set-up (refer to FIG. 2).

The Access Tier primarily depicts the transport network which may include the Internet, Wireless Network or edge Cache, amongst other channels of delivery. These channels of delivery will deliver the content and any required notifications via the respective protocols. As discussed above, the content and notifications can be delivered on different channels, depending on the preferences and type of content.

The Services Tier primary contains the Messaging Gateway Framework 65 and the Agent 30 with all the protocol support required to connect to the underlying telecommunications infrastructure platform as well as to the Messaging Gateway Framework via the various protocols that are required for delivery of the content. For example, the Messaging Gateway Framework supports: XMPP (Extensible Messaging and Presence Protocol) Gateway, SMSC (SMPP), MMSC (MM7), WAP Gateway, Web Services Gateway (W/S), and/or SIP Gateway. All of these protocols can be supported by the system and method of the invention, unlike in known technologies.

The Agent is shown as a Media Distribution Platform. The Platform includes a transcoder, as well as a rules engine, mediation, routing and protocol conversion engine. In embodiments, as the sender of content may have no visibility into the receiver's rendering capabilities, the rules engine will be used to parse the preferences of the sender and the receiver in order to coordinate the delivery of the content by the Agent. The mediation can be an Enterprise Service Bus which is configured to apply the rules (preferences). The protocol conversion engine is a core function which converts the content from one protocol to another protocol, again depending on the content and preferences. For example, the protocol conversion engine can convert data transmission from asynchronous to synchronous, TCP/IP to another protocol, etc.

The Control Tier primarily comprises elements of the IMS control (e.g., S-CSCF, a charging platform and an HSS). The Control Tier also includes elements of the non IMS tier networks. For example, a device profile component may be included in the Control Tier, which is a database (e.g., Storage System 22B) storing the preferences of the end points (sending client and receiving client). The Agent can communicate with the device profile via W/S. The Client Tier also includes the location platform which is in communication with the Agent via Open LS or Parlay X.

Exemplary Uses Implementing the System and Method of the Invention

The present invention also implements a Media Baseline which allows the system and method to generate one baseline representation of media and send each user the corresponding media to their respective and desired device. For example, a baseline XML for Multiple Notifications can be written as follows:

```
<Media>
    <recipients>
    <User ="404 555 1212">
    </recipients>
    <subject>
```

With the subject as follows:

```
        </subject>
        <body>
```

With the body as follows:

```
        </body>
        <preview type="video">
        </preview>
        <uncompressed>
        </uncompressed>
        </compressed type="quicktime">
        </compressed>
        </Media>
```

Additionally, a representative set of exemplary call flows are described below. These call flows describe some of the services and capabilities that are implemented using the system and method of the invention, based on user preferences.

View Content

A subscriber views some content on his/her browser and wants to notify his/her friends about the content. He/She requests the system to deliver the content to the friend. As a case in point, one of the subscribers has requested that the content be sent to a Set Top Box at home. When that subscriber gets home (location platform dip), and turns on the television, he/she is notified about the content and views the content, which has been downloaded to his Personal Storage Device at his residence. The agent and/or charging platform generates the billing record, depending on the typed of delivered content, amount of content, user preferences, etc. as discussed herein.

Create Content

A subscriber creates content on his/her device and wants to notify his/her friends about the content. He/She requests the system to deliver the content to the friend. As a case in point, one of the subscribers has requested that his content be sent to his Set Top Box at home. When that subscriber gets home (location platform dip), and turns on his TV, he/she is notified about the content and views the content, which has been downloaded to his Personal Storage Device at his residence. The agent and/or charging platform generates the billing record, depending on the typed of delivered content, amount of content, user preferences, etc. as discussed herein.

Notification Scenarios

A subscriber gets an SMS notification about some content sent to his/her media player on his home personal computer. He/She logs into his/her personal computer at home and views the content.

A subscriber gets an SMS notification about some content sent to his/her media player on his home Entertainment System or personal computer. He/She may retrieve a proxy or synopsis of that content on the mobile device.

A subscriber gets a WAP based notification sent to his device, transcoded to the format that his/her device can support and views the content immediately.

While the invention has been described in terms of embodiments, those skilled in the art will recognize that the invention can be practiced with modifications and in the spirit and scope of the appended claims.

What is claimed is:

1. A method, comprising:
  receiving, by a computer device, content of a first media type over a network from a sending client, wherein the content is intended for distribution to a receiving client;
  retrieving, by the computer device, preferences for both the sending client and the receiving client;
  performing, by the computer device, a transcoding operation on the content to convert the content from the first media type to a preferred media type based on the preferences retrieved for the receiving client;
  delivering, by the computer device, the content in the preferred media type to an edge content location for future retrieval by the receiving client;
  providing, by the computer device, a notification to a preferred device of the receiving client that indicates the content is ready for delivery, wherein the notification is a reference to the content on the edge content location;
  providing, by the computer device, a notification to a mobile device of the receiving client that indicates the content is ready for delivery;
  receiving, by the computer device, a request from the preferred device of the receiving client for retrieval of the content on the edge content location;
  sending, by the computer device, the content in the preferred media type to the preferred device in accordance with the preferences retrieved for the receiving client; and generating, by the computer device, a billing record based on the content, a type of the preferred device, the retrieved preferences of the receiving client, and the preferred device being a non-IP Multimedia Subsystem (IMS) enabled device;

wherein the preferred device is a set-top box which is different from that of the mobile device;

location information of the receiving client is requested and received, by the computer device, in order to generate the billing record;

a geographic separation between the receiving client and the sending client is determined, by the computer device;

the preferences of the receiving client include a number of a plurality of devices of the receiving client in which the content is sent to including the preferred device; and the billing record includes a premium billing charge based on any of the plurality of devices of the receiving subscriber in which the content is delivered to that are non-IMS enabled, wherein the premium billing charge is further based on a route that the content is sent through in a Messaging Gateway Framework, and wherein the preferences of the receiving client further includes:
the plurality of devices of the receiving client which are to receive the content;
time sensitivity of the content;
number of times the content is to be sent to the receiving client; and
whether the receiving client is a prepaid client, ad hoc client or post paid client.

2. The method of claim 1, wherein the billing record is provided to at least one of the sending client and receiving client.

3. The method of claim 1, further comprising notifying, by the computer device, at least one of the receiving client and the sending client of a billing event.

4. The method of claim 1, wherein the billing record is based on computer resources required to send the content to the receiving client.

5. The method of claim 4, wherein the computer resources required to send the content to the receiving client comprises processing cycles required to send the content to the receiving client.

6. The method of claim 1, wherein the billing record includes the premium billing charge further based on the transcoding required to send the content to the receiving client, time sensitive nature of the content, a location of the preferred device, routing of the content to the receiving client, and the type of the preferred device.

7. The method of claim 1, wherein the billing record reflects no charge when the receiving client views an advertisement.

8. The method of claim 1, wherein the billing record reflects no charge when the receiving party does not view the content.

9. The method of claim 1, wherein a service provider generates the billing record for a fee or on a subscription basis.

10. The method of claim 1, wherein the steps of claim 1 are provided on a computing infrastructure which is at least one of maintained, deployed, supported and created by a service provider.

11. The method of claim 1, further comprising applying a billing charge in the billing record based on the type of the preferred device, which takes into account capabilities of the preferred device, the billing record including the premium billing charge based on the preferred device being a non-compatible device with the predetermined network.

12. The method of claim 1, wherein the premium billing charge is further based on a selected charging model from a set-up window.

13. The method of claim 1, wherein the premium billing charge is based on processing cycles required to perform the transcoding operation such that a number of the processing cycles required to perform the transcoding operation corresponds to a billing rate.

14. The method of claim 1, wherein the premium billing charge is based on the time sensitivity of the client such that time sensitive content corresponds to a higher billing rate than non-time sensitive content.

15. A method of implementing charging models for charging a subscriber for sending subscriber driven media content delivery across different networks, comprising:
receiving, by a computing device, selection from a sending subscriber of a first charging model for delivering the subscriber driven media content across the different networks, the first charging model being based at least on a media type of the content and a location from which the content is being delivered from,
receiving, by the computing device, selection from a receiving subscriber of a second charging model based at least on complexity of transcoding the content from the media type to a preferred media type of the receiving subscriber, a location at which the content is being delivered, a number and type of a plurality of devices of the receiving subscriber that are configured to receive the content in the preferred media type, and the plurality of the devices of the receiving subscriber being set-top boxes and being non-IP Multimedia Subsystem (IMS) enabled devices;
generating, by the computing device, a billing report for the sending subscriber that includes charges based on the first charging model; and
generating, by the computing device, a billing report for the receiving subscriber that includes charges based on the second charging model and premium charges for any of the plurality of devices of the receiving subscriber in which the content is delivered to that are non-IMS enabled and a network route required to deliver the content from the sending subscriber to the receiving subscriber,
wherein the billing report for the receiving subscriber further includes premium charges based on a time sensitive nature of the content, the location at which the content is being delivered, and an amount of content that is to be viewed by the receiving subscriber.

16. The method of claim 15, wherein the second charging model is further based on a number of times the content is to be sent to the receiving subscriber and whether the receiving subscriber is a prepaid subscriber, ad hoc subscriber or post paid subscriber.

17. The method of claim 15, wherein the billing report for the sending subscriber further includes premium charges based on computer resources expended in order to send the content to the receiving subscriber.

18. The method of claim 17, further comprising making no charge on the billing report for the receiving subscriber based on an agreement with the receiving subscriber to view an advertisement.

19. The method of claim 15, wherein the charging platform is at least one of maintained, deployed, supported and created by a service provider.

20. The method of claim 15, wherein
the charges in the in the billing report for the receiving subscriber based on the type of the plurality of devices of the receiving subscriber that are configured to receive the content takes into account capabilities of the plurality of devices.

21. A computer program product comprising a computer readable hardware storage device having readable program code embodied in the computer readable hardware storage device, the program code executable by a computer device to cause the computer device to:
receive content of a first media type over a network from a sending client, wherein the content is intended for distribution to a receiving client;
retrieve preferences for both the sending client and the receiving client;
perform a transcoding operation on the content to convert the content from the first media type to a preferred media type based on the preferences retrieved for the receiving client;
deliver the content in the preferred media type to an edge content location for future retrieval by the receiving client;
determine a location of the receiving client;
provide a notification to a preferred device of the receiving client that indicates the content is ready for delivery;
provide a notification to a mobile device of the receiving client that indicates the content is ready for delivery;
receive a request from the preferred device of the receiving client for retrieval of the content on the edge content location;
send the content in the preferred media type to the preferred device in accordance with the preferences retrieved for the receiving client;
generate a billing record for the sending client that includes billing charges based on the preferences received for the sending client; and
generate a billing record for the receiving client that includes a billing charge based on the preferred type of the content to be delivered to the receiving client, a type of the preferred device, a number of a plurality of devices of the receiving client in which the content is sent to including the preferred device, and the preferred device being a non-IP Multimedia Subsystem (IMS) enabled device, and a premium billing charge based on the location of the receiving client, any of the plurality of devices of the receiving client in which the content is delivered to that are non-IMS enabled, and a network route required to deliver the content from the sending client to the receiving client,
wherein the preferred device is a set-top box which is different from that of the mobile device, and
wherein the billing charge on the billing record for the receiving client is further based on:
the plurality of devices of the receiving client which are to receive the content;
time sensitivity of the content;
number of times the content is to be sent to the receiving client;
amount of content that is to be viewed by the receiving client; and
whether the receiving client is a prepaid client, ad hoc client or post paid client.

22. The computer program product of claim 21, wherein:
the billing charge in the billing record for the receiving client based on the type of the preferred device takes into account capabilities of the preferred device; and
the billing record includes the premium billing charge based on the preferred device being a non-compatible device with the predetermined network.

* * * * *